United States Patent
Guo

(10) Patent No.: US 12,455,441 B2
(45) Date of Patent: Oct. 28, 2025

(54) ADJUSTABLE INFRARED OPTICAL FILTER DEVICE

(71) Applicant: SHENZHEN HYPERNANO OPTICS TECHNOLOGY CO., LTD, Shenzhen (CN)

(72) Inventor: Bin Guo, Shenzhen (CN)

(73) Assignee: SHENZHEN HYPERNANO OPTICS TECHNOLOGY CO., LTD., Shenzhen (CN)

( * ) Notice: Subject to any disclaimer, the term of this patent is extended or adjusted under 35 U.S.C. 154(b) by 649 days.

(21) Appl. No.: 17/910,725

(22) PCT Filed: Jan. 17, 2020

(86) PCT No.: PCT/CN2020/072828
§ 371 (c)(1),
(2) Date: Sep. 9, 2022

(87) PCT Pub. No.: WO2021/142791
PCT Pub. Date: Jul. 22, 2021

(65) Prior Publication Data
US 2023/0194853 A1 Jun. 22, 2023

(51) Int. Cl.
*G02B 1/02* (2006.01)
*G02B 5/20* (2006.01)
(Continued)

(52) U.S. Cl.
CPC .............. *G02B 26/001* (2013.01); *G02B 1/02* (2013.01); *G02B 5/208* (2013.01); *G01J 3/26* (2013.01)

(58) Field of Classification Search
CPC ........ G02B 26/001; G02B 1/02; G02B 5/208; G02B 5/284; G01J 3/26; G01J 5/0802
See application file for complete search history.

(56) References Cited

U.S. PATENT DOCUMENTS 6,768,097 B1 * 7/2004 Viktorovitch ...... G02B 6/29395
250/227.28
7,049,004 B2 * 5/2006 Domash ................ G02B 5/284
428/912.2
(Continued)

FOREIGN PATENT DOCUMENTS

CN 1285034 A 2/2001
CN 101666907 A 3/2010
(Continued)

OTHER PUBLICATIONS

English Translation of ISR from PCT/CN2020/072828 dated Oct. 21, 2021 (3 pages).

*Primary Examiner* — Balram T Parbadia
(74) *Attorney, Agent, or Firm* — Calfee, Halter & Griswold LLP

(57) ABSTRACT

A tunable infrared optical filter device, includes a first mirror and a second mirror bonded to each other to form a cavity therebetween. A surface of a position where the first mirror and the second mirror are bonded to each other is provided with an electrode for driving the first mirror or the second mirror to move, and each of the first mirror and the second mirror is a distributed Bragg reflector formed by bonding silicon films. The silicon film may be formed by machining the silicon film wafer, to form the distributed Bragg reflector composed of the two silicon films and the chambers therebetween. The distributed Bragg reflector may also be formed by bonding the silicon film and the silicon film of an SOI wafer.

20 Claims, 3 Drawing Sheets

(51) Int. Cl.
*G02B 26/00* (2006.01)
*G01J 3/26* (2006.01)

(56) References Cited

U.S. PATENT DOCUMENTS

| | | | |
|---|---|---|---|
| 2002/0061042 A1* | 5/2002 | Wang | H01S 5/18366 |
| | | | 372/43.01 |
| 2005/0052746 A1* | 3/2005 | Shih | G02B 26/001 |
| | | | 359/578 |
| 2005/0094964 A1 | 5/2005 | Sato | |
| 2005/0226281 A1* | 10/2005 | Faraone | G02B 26/001 |
| | | | 372/20 |
| 2007/0242358 A1 | 10/2007 | Lin et al. | |
| 2010/0142067 A1* | 6/2010 | Hanamura | G02B 5/284 |
| | | | 359/850 |
| 2014/0091211 A1 | 4/2014 | Kitahara | |
| 2014/0111811 A1* | 4/2014 | Tuohiniemi | G01J 3/26 |
| | | | 356/519 |
| 2015/0153563 A1* | 6/2015 | Kamal | H01S 3/1062 |
| | | | 359/578 |
| 2016/0380404 A1* | 12/2016 | Bulovic | G01L 1/24 |
| | | | 372/20 |
| 2017/0012199 A1* | 1/2017 | Sabry | G01J 3/0208 |
| 2022/0003534 A1* | 1/2022 | Stein | G02B 26/007 |

FOREIGN PATENT DOCUMENTS

| | | |
|---|---|---|
| CN | 102225739 A | 10/2011 |
| CN | 202599535 U | 12/2012 |
| CN | 103048283 A | 4/2013 |
| CN | 103293660 A | 9/2013 |
| CN | 103728275 A | 4/2014 |
| CN | 105242395 A | 1/2016 |
| CN | 107479184 A | 12/2017 |

* cited by examiner

ADJUSTABLE INFRARED OPTICAL FILTER DEVICE

CROSS REFERENCE TO RELATED APPLICATIONS

This application is a national application of PCT/CN2020/072828, filed on Jan. 17, 2020, the contents of which are all hereby incorporated by reference.

FIELD

The present disclosure relates to the field of filters, in particular to a tunable infrared optical filter device.

BACKGROUND

Spectral imaging in the mid-infrared and thermal infrared range (e.g. 3000 nm-14000 nm) is widely used in the fields such as real-time gas identification and leak monitoring. At present, spectral cameras in the relevant wavelength range mainly adopt the beam splitting technology based on wheel filters or prisms. The resulting equipment is large in size and high in cost, which greatly hinders large-scale application of infrared spectral imaging technology. In the research field, tunable filter devices based on Fabry-Perot interference (tunable FPI) have been used to form infrared spectrometer modules. However, there are still no related FPI technologies applied in miniaturized low-cost infrared spectral imaging.

The existing FPI devices are mainly formed by micromachining, including bulk-micromachined devices and surface-micromachined devices. The movable mirror in the surface-micromachined device is formed from a suspended thin film. The movable mirror in the bulk-micromachined device is formed from a substrate with a cantilever beam structure.

For the bulk-micromachined device, fabrication of the cantilever beam in the substrate may increase the complexity in design and fabrication of the device, thereby increasing the cost. Moreover, the elastic structure (spring) and the mirrors in the bulk-micromachined device are provided by the same substrate, which leads to the intrinsic stress and deformation of the mirrors under the influence the elastic structure. The cantilever beam structure takes up a large chip area, which thereby limits the size of the mirrors. For the surface-micromachined device, it is now difficult to realize large-scale commercial application because of the difficulty in fabrication and its complicated techniques.

In view of the above, it is very important to design a novel FPI device structure for spectral imaging in the mid-infrared and thermal infrared range.

SUMMARY

In view of the problems that the existing Fabry-Perot cavity devices in the mid-infrared and thermal infrared bands are unable to provide a solution for hyperspectral imaging and the existing FPI devices are difficult to fabricate and complicated in techniques, embodiments of the present application provide a tunable infrared optical filter device to solve the above problems.

According to a first aspect, the present application provides a tunable infrared optical filter device, including a first mirror and a second mirror bonded to each other to form a cavity therebetween. A surface of a position where the first mirror and the second mirror are bonded to each other is provided with an electrode for driving the first mirror or the second mirror to move, and each of the first mirror and the second mirror respectively are distributed Bragg reflectors formed by bonding silicon films. Forming the first mirror and the second mirror by bonding the silicon films may simplify the technique and effectively reduce the size of the device.

Preferably, the first mirror and the second mirror are respectively formed on a silicon base with an insulating layer, and each of the first mirror and the second mirror includes the distributed Bragg reflector composed of two silicon films that form chambers therebetween through multipoint bonding. At this time, the first mirror and the second mirror form a movable mirror structure composed of the two silicon films and the chambers therebetween, and the first mirror and the second mirror form a Fabry-Perot cavity structure through bonding. The use of the thin film structure to form the Fabry-Perot cavity may effectively reduce the size of the device.

Preferably, the silicon film of the first mirror or the second mirror is the silicon film formed by removing a silicon substrate and a corresponding insulating layer on a silicon film wafer. Making the silicon film from the silicon film wafer may have lower cost and reduce fabrication difficulty.

Preferably, the silicon base is formed from the silicon substrate of the silicon film wafer. The silicon base may be formed by partially removing the silicon substrate of the silicon film wafer, which is simple and convenient.

Preferably, surfaces of the first mirror and the second mirror facing away from the cavity are provided with a ring weight, respectively. The ring weight may improve the flatness of the first mirror and the second mirror.

Preferably, the ring weight is made by retaining part of the silicon substrate on the silicon film wafer. Therefore, the ring weight is easy to fabricate.

Preferably, each of the first mirror and the second mirror is the distributed Bragg reflector formed by multipoint bonding the silicon film to a silicon film of an SOI wafer, and the silicon substrate in an area of the SOI wafer corresponding to an active area of the device is partially removed. At this time, the first mirror and the second mirror are both formed by bonding the silicon film to the silicon film of the SOI wafer, which is convenient to fabricate and reliable.

Preferably, the area of the SOI wafer where the silicon substrate is removed has a thickness of 10-200 microns. The first mirror and the second mirror with this thickness may be designed to form movable mirrors according to the mechanical properties of the device.

Preferably, the area of the SOI wafer where the silicon substrate is removed includes an insulating layer and a silicon film of the SOI wafer. The silicon substrate may be removed by etching, and the insulating layer of the SOI wafer and the silicon film of the SOI wafer are remained as the movable mirror.

Preferably, the silicon substrate and the insulating layer on periphery of the SOI wafer form a silicon base for carrying the first mirror or the second mirror. The silicon base may be used as a support for the assembly of the device.

Preferably, each of the first mirror and the second mirror is a distributed Bragg reflector formed by multipoint bonding the silicon film to a silicon substrate, and the portions of the first mirror and the second mirror are bonded to each other corresponds to a position of one of the chambers formed between the silicon film and the silicon substrate. It is a simple structure in which the silicon film and the chambers form an elastic movable structure driving the first mirror or the second mirror to move.

Preferably, a side of the silicon substrate facing away from the cavity is provided with an insulating layer. The insulating layer may be obtained by deposition or thermal oxidation on the silicon substrate. Therefore, the insulating layer is simple in source and convenient to fabricate.

Preferably, the insulating layer is a silica or anti-reflection film. The silica or anti-reflection film may reduce the light reflectivity on the insulating layer and increase the light transmittance.

Preferably, the silicon film includes monocrystalline silicon film formed on a SOI wafer or the polycrystalline silicon film formed by deposition on the silicon substrate with an insulating layer. The silicon film may be formed from the SOI wafer processing or by chemical vapor deposition, so the production process is mature and less difficult.

Preferably, the optical thickness of the silicon film and the chamber is ¼ of the center wavelength of the device. The optical thickness of the silicon film and the chamber may be controlled by the center wavelength of the device (for example, 3000 nm-14000 nm), and further, the physical thickness of the silicon film and the chamber may be obtained, thereby meeting the requirements of the FPI devices in the mid-infrared and thermal infrared range.

Preferably, the ways of bonding includes eutectic bonding, polymer bonding, anodic bonding or direct silicon-silicon bonding. There are diverse bonding methods that are mature in technology, which is conducive to industrial production.

The embodiments of the present application disclose a tunable infrared optical filter device, including the first mirror and the second mirror bonded to each other forming the cavity therebetween. The surface of the portion where the first mirror and the second mirror which are bonded to each other is provided with the electrode for driving the first mirror or the second mirror to move, and the first mirror and the second mirror are distributed Bragg reflectors formed by bonding the silicon films. The silicon film may be formed by machining the silicon film wafer, to form the distributed Bragg reflector composed of the two silicon films and the chambers therebetween. The distributed Bragg reflector may also be formed by bonding the silicon film and the silicon film of the SOI wafer. Besides, the first mirror and the second mirror may also be bonded at the silicon film adjacent to the chambers to form an elastic movable structure, thereby further driving the first mirror or the second mirror to move. The optical filter device is applicable in the infrared wavelength range, is simple in structure and mature in machining techniques, can effectively reduce the size of the FPI device, and can realize large-scale commercial production in industry.

BRIEF DESCRIPTION OF THE DRAWINGS

The accompanying drawings are included to provide a further understanding of the embodiments and the accompanying drawings are incorporated into and constitute a part of this specification. The accompanying drawings illustrate the embodiments and together with the description serve to explain the principles of the present disclosure. Many intended advantages of other embodiments and embodiments will be easily recognized as they become better understood by reference to the following detailed description. The elements of the accompanying drawings are not necessarily proportional to each other. The same reference signs designate corresponding similar parts.

DETAILED DESCRIPTION OF THE EMBODIMENTS

Figure 1:
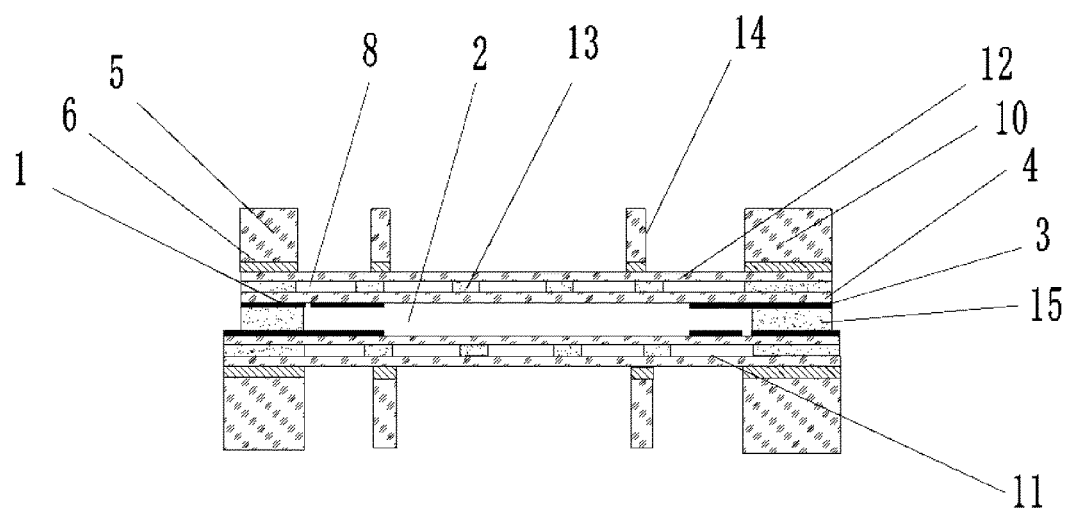
FIG. 1 is a schematic sectional view of a tunable infrared optical filter device according to Embodiment I of the present application.

The present application will be further described in detail below with reference to the accompanying drawings and embodiments. It should be understood that the specific embodiments described herein are only used to explain the related disclosure, but not to limit the disclosure. In addition, it should be noted that, for the convenience of description, only the parts related to the related disclosure are shown in the accompanying drawings.

It should be noted that the embodiments in the present application and the features in the embodiments may be combined with each other in the case of no conflict. The present application will be described in detail below with reference to the accompanying drawings and in conjunction with the embodiments.

Embodiments of the present disclosure provide a tunable infrared optical filter device 1, including a first mirror 11 and a second mirror 12 bonded to each other forming a cavity 2 therebetween. A surface of a portion of the first mirror 11 and the second mirror 12 which are bonded to each other is provided with an electrode 3 for driving the first mirror 11 or the second mirror 12 to move, and the first mirror 11 and the second mirror 12 are distributed Bragg reflectors formed by bonding silicon films 4. The distributed Bragg reflectors (DBRs) are used as the reflectors in a Fabry-Perot cavity structure. When light passes through different media, it will be reflected at the interface, and the reflectivity will be related to the refractive index between the media. Therefore, if thin films with different refractive indexes are periodically stacked, when light passes through these thin films with different refractive indexes, the light reflected from each layer interferes with each other due to the change of phase angle, and then combines with each other to obtain strong reflected light, which can reduce the reflection of light within a certain wavelength range and increase the luminous flux. In a preferred embodiment, the first mirror 11 and the second mirror 12 are distributed Bragg reflectors in a silicon/air/silicon stack structure formed by bonding silicon films 4. The silicon film 4 may be made by directly machining a silicon film wafer. This process is simple and mature in technology, and meets the requirements of industrial production. The tunable infrared optical filter device 1 is simple in machining technique and low in cost, and can be applied to miniaturized infrared spectrum imaging equipment.

Embodiment I

Figure 2:
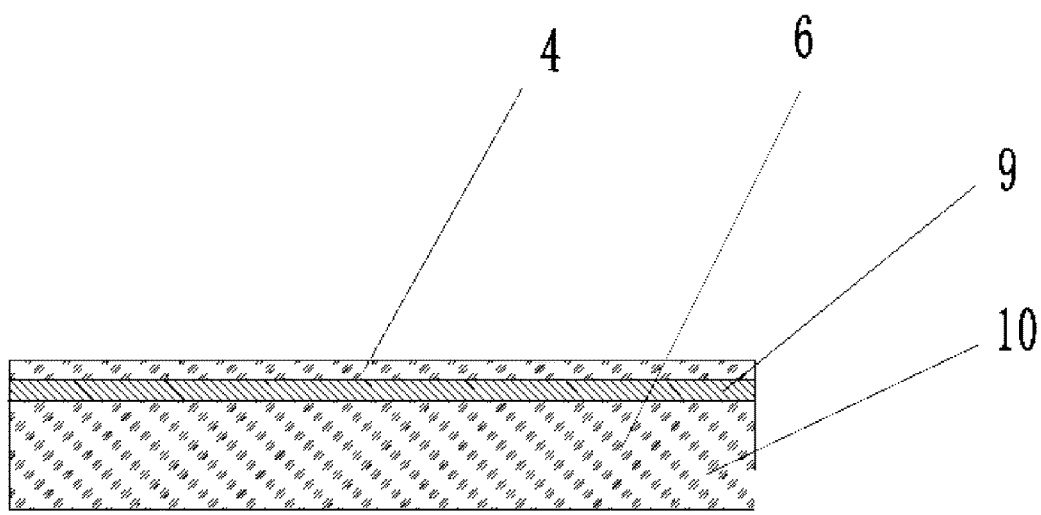
FIG. 2 is a schematic sectional view of a silicon film wafer of the tunable infrared optical filter device according to Embodiment I of the present application.

FIG. 1 shows a sectional view of a tunable infrared optical filter device 1 according to Embodiment I of the present disclosure. As shown in FIG. 1, the first mirror 11 and the second mirror 12 are respectively formed on a silicon base 5. The silicon film 4 of the first mirror 11 or the second mirror 12 is the silicon film 4 formed by removing a silicon substrate 10 and a corresponding insulating layer 9 on the silicon film wafer 6. Each of the first mirror 11 and second mirror 12 includes the distributed Bragg reflector composed of two silicon films 4 that form chambers 8 therebetween through multipoint bonding. The silicon base 5 is a part of the silicon film wafer 6, and the silicon film wafer 6 is preferably the structure as shown in FIG. 2, that is, the stack of the silicon substrate 10, the insulating layer 9 and the silicon film 4. The silicon film 4 on the silicon film wafer 6 has a certain thickness. The silicon film 4 on the silicon film wafer 6 may be a polycrystalline silicon film formed by deposition. Preferably, the silicon film wafer 6 may also be an SOI wafer 6, and at this time, the silicon film 4 on the SOI wafer 6 is monocrystalline silicon. In a preferred embodiment, the silicon film 4 of the first mirror 11 or the second mirror 12 is formed by removing the silicon substrate 10 from the SOI wafer 6. On one hand, on a surface of the first mirror 11 or the second mirror 12 facing the cavity 2, the silicon substrate 10 of the SOI wafer 6 is completely removed by grinding or etching to form the silicon film 4. On the other hand, on a surface of the first mirror 11 or the second mirror 12 facing away from the cavity 2, the silicon substrate 10 of the SOI wafer 6 is partially removed to form the silicon base 5. Therefore, the silicon film 4 is formed by machining the SOI wafer 6. This process is simple and convenient and can realize industrial production. The first mirror 11 and the second mirror 12 are respectively disposed on the silicon base 5, which is convenient for the subsequent support and assembly of the FPI device.

Figure 3:
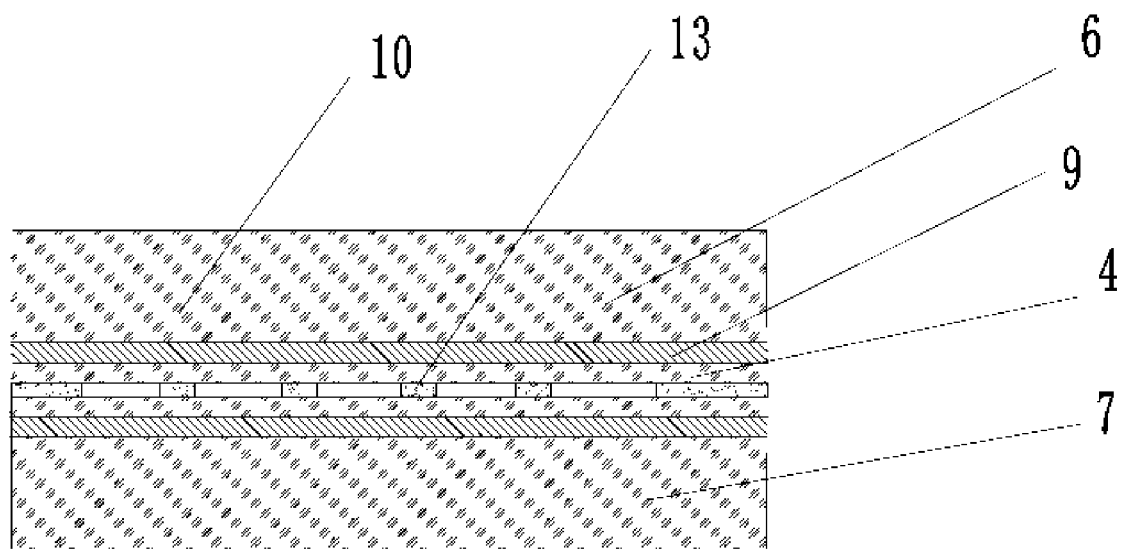
FIG. 3 is a schematic sectional view of a composite layer of the tunable infrared optical filter device according to Embodiment I of the present application.

The silicon film 4 of the first mirror 11 or the second mirror 12 is the silicon film 4 formed by removing the silicon substrate 10 and the corresponding insulating layer 9 on the silicon film wafer 6. The mode of machining the silicon film wafer 6 to form the silicon film 4 and the first mirror 11 or the second mirror 12 may specifically include: the surfaces of the two silicon film wafers 6 with the silicon films 4 are faced with each other, and multipoint bonding is carried out to form a composite layer 7 as shown in FIG. 3. The multipoint bonding here is to dispose a plurality of first bonds 13 between two silicon film wafers 6, and the chambers 8 are formed between the first bonds 13. The silicon substrate 10 on the silicon film wafer 6 on one side of the composite layer 7 is completely removed to retain the silicon film 4, and the silicon substrate 10 on the silicon film wafer 6 on the other side corresponding to an active working area of the device 1 is partially removed to form the silicon base 5. In a preferred embodiment, the silicon substrate 10 of the SOI wafer 6 is completely removed by grinding or etching to form the silicon film 4, so the mode of machining the SOI wafer 6 to form the silicon film 4 is simple and reliable.

Figure 4:
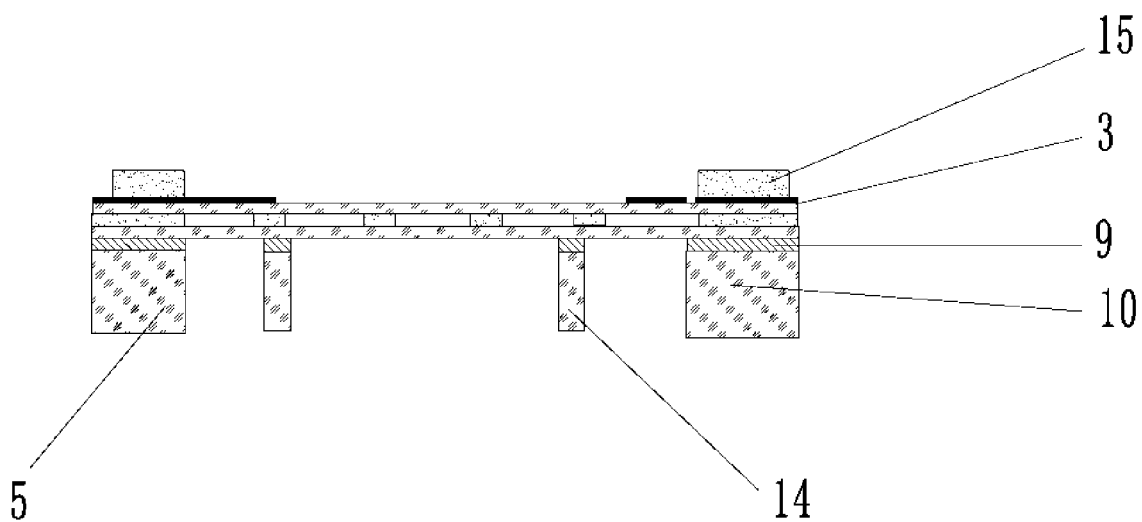
FIG. 4 is a schematic sectional view of a first mirror or a second mirror of the tunable infrared optical filter device according to Embodiment I of the present application.

As shown in FIG. 4, in a preferred embodiment, the silicon base 5 is formed from the silicon substrate 10 of the SOI wafer 6. There is an insulating layer 9 on the silicon base 5. Surface of the first mirror 11 and the second mirror 12 facing away from the cavity 2 are provided with a ring weight 14 respectively. In an optional embodiment, the ring weight 14 is made by remaining part of the silicon substrate 10 on the SOI wafer 6. Part of the silicon base 5 may be removed by plasma etching, and the like, to form the ring weight 14 that is used to improve the flatness of the first mirror 11 and the second mirror 12. It should be recognized that the shape of the ring weight 14 is not limited to a ring shape, and may also be other regular or irregular shapes such as an ellipse and a rectangle. The etching method is not limited to plasma etching, and may also be chemical reagent etching. A suitable etching method is selected to obtain a desired shape according to the specific usage scenario.

The SOI wafer 6 of the composite layer 7 is removed to obtain the structure of the first mirror 11 or the second mirror 12 as shown in FIG. 4. At this time, each of the first mirror 11 and the second mirror 12 includes two silicon films 4 that form the chambers 8 therebetween by multipoint bonding, thereby forming the distributed Bragg reflector. The existence of the silicon films 4 can effectively reduce the size of the whole device 1. Finally, the first mirror 11 and the second mirror 12 are bonded to form the Fabry-Perot cavity structure, as shown in FIG. 1. A second bond 15 is located on the outer periphery of the first mirror 11 and the second mirror 12, respectively, and the first mirror 11 and the second mirror 12, which are movable mirror structures, may be driven to move by the electrode 3, so that a good filtering effect can be achieved. The optical thickness of the silicon film 4 and the chamber 8 is ¼ of the center wavelength of the device 1. The optical thickness of the silicon film 4 and the chamber 8 may be controlled by the center wavelength of the device 1 (for example, 3000 nm-14000 nm), and further, the physical thickness of the silicon film 4 and the chamber 8 may be obtained, thereby meeting the requirements of the FPI devices in the mid-infrared and thermal infrared range. In optics, the optical thickness is equal to the refractive index multiplied by the physical thickness. For example, if the central wavelength of the device 1 is 3000 nm and the refractive index of the silicon film 4 is 3, then the physical thickness of the silicon film 4 is 3000/4/3=250 nm.

The optical filter device 1 is fabricated on the basis of the SOI wafer 6, so the machining technique is simple and convenient. Moreover, the optical filter device 1 is composed of the silicon films 4, so the size of the device can be significantly reduced, which is conductive to its application to miniaturized low-cost infrared spectral imaging equipment.

Embodiment II

Figure 5:
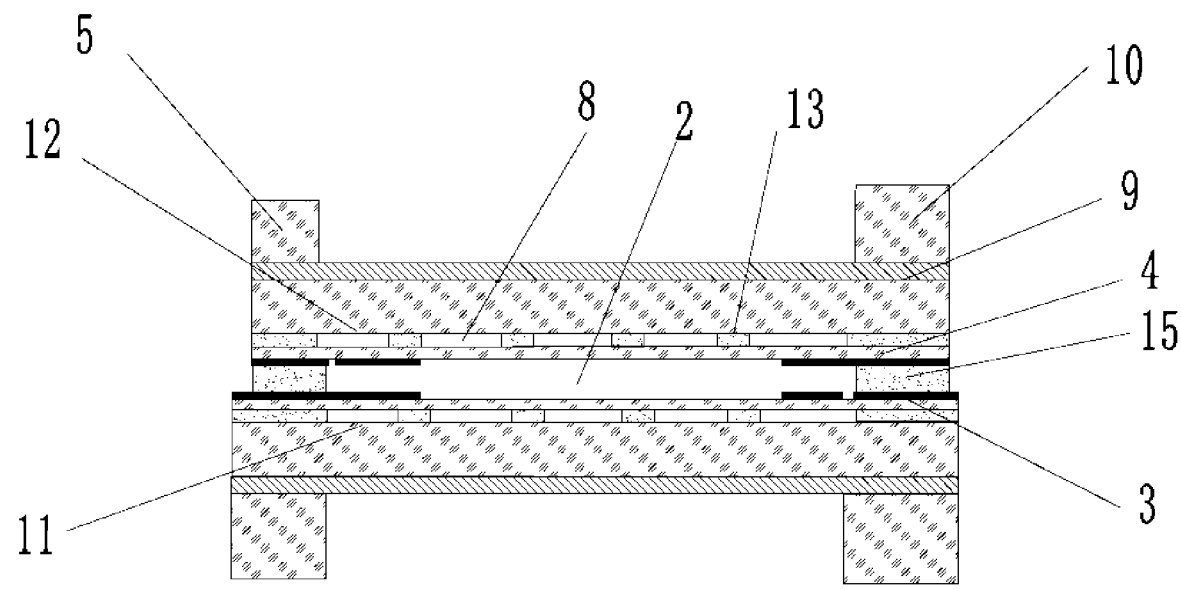
FIG. 5 is a schematic sectional view of a tunable infrared optical filter device according to Embodiment II of the present application.

As shown in FIG. 5, each of the first mirror 11 and the second mirror 12 is the distributed Bragg reflector formed by multipoint bonding the silicon film 4 to the silicon film 4 of the SOI wafer 6, and the silicon substrate 10 in an area of silicon film 4 of the SOI wafer 6 corresponding to an active working area of the device 1 is partially removed. At this time, the silicon film 4 is relatively thin, and the silicon film 4 of the SOI wafer 6 is relatively thick. In a preferred embodiment, the area of the SOI wafer where the silicon substrate 10 is removed has a thickness of 10-200 microns, which allows the first mirror and the second mirror to be designed as movable mirrors according to the mechanical properties of the device.

In a preferred embodiment, the area of the SOI wafer 6 where the silicon substrate 10 is removed includes the insulating layer 9 and the silicon film 4 of the SOI wafer 6. The silicon substrate 10 may be removed by etching, and the insulating layer 9 of the SOI wafer 6 and the silicon film 4 of the SOI wafer 6 are remained as the movable mirror. A silicon base 5 for carrying the first mirror 11 or the second mirror 12 is formed on the silicon substrate 10 and the insulating layer 9 on a periphery of the SOI wafer 6. At this time, the first mirror 11 and the second mirror 12 are both formed by bonding the silicon film 4 to the silicon film 4 of the SOI wafer 6, and in the multipoint bonding, first bonds 13 are arranged at intervals to form the chambers 8.

In a preferred embodiment, the silicon film 4 may be the silicon film 4 of the silicon film wafer 6 or the SOI wafer 6, and the silicon film 4 of the SOI wafer 6 is monocrystalline silicon. The silicon film 4 may also be a polycrystalline silicon film formed by deposition. In one case, the silicon film 4 of the SOI wafer 6 may be formed by further machining the SOI wafer 6, and for the specific machining process, reference may be made to the manufacturing process of the silicon film 4 in Embodiment I. In another case, the silicon film 4 may be the polycrystalline silicon film formed by chemical vapor deposition. These two manufacturing processes are both mature and low in cost. The method of machining the SOI wafer 6 to form the silicon film 4 is simple and reliable. In a preferred embodiment, the insulating layer 9 is a silica or anti-reflection film. The silica or anti-reflection film on the silicon film 4 of the SOI wafer 6 may reduce the reflection of light on the insulating layer 9 and increase the light transmittance. Finally, a second bond 15 is disposed on the outer periphery of the first mirror 11 and the second mirror 12, respectively, to bond the first mirror 11 and the second mirror 12 together so as to form the Fabry-Perot cavity structure. The electrode 3 is used to control the movement of the first mirror 11 and the second mirror 12 so as to change the distance between the first mirror 11 and the second mirror 12, thereby changing the resonance condition, achieving the filtering effect, and obtaining light with a desired wavelength.

Embodiment III

Figure 6:
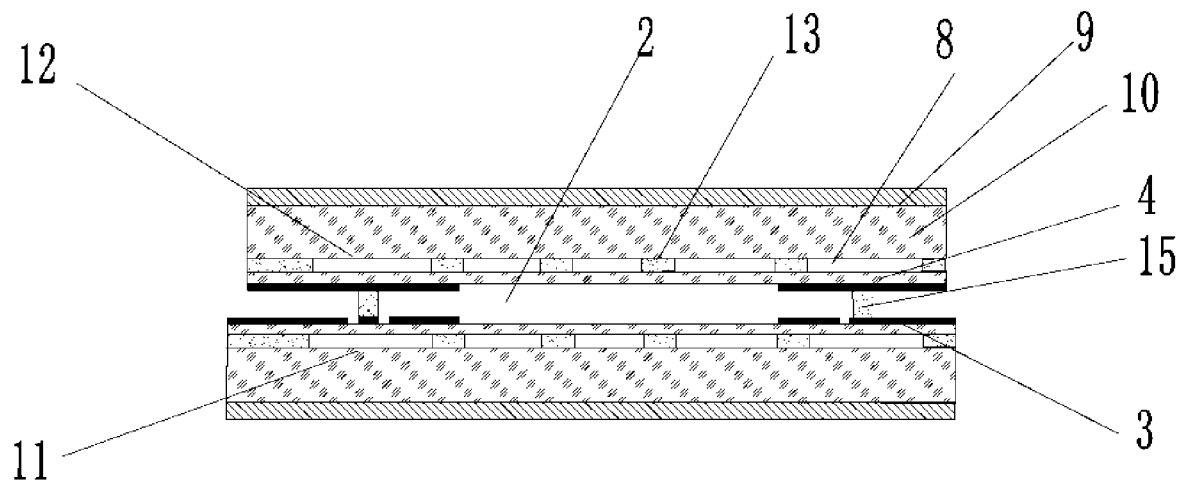
FIG. 6 is a schematic sectional view of a tunable infrared optical filter device according to Embodiment III of the present application.

As shown in FIG. 6, the first mirror 11 and the second mirror 12 form the distributed Bragg reflector, respectively, by multipoint bonding the silicon film 4 to the silicon substrate 10, and in the multipoint bonding, first bonds 13 are arranged at intervals to form the chambers 8. The position where the first mirror 11 and the second mirror 12 are bonded to each other corresponds to a position of one of the chambers 8 formed between the silicon film 4 and the silicon substrate 10. At this time, the bonding position of the first mirror 11 and the second mirror 12 are bonded to each other by a second bond 15, and the second bond 15 is disposed at a position of one of the chambers 8 formed between the silicon film 4 and the silicon substrate 10. In this way, the silicon film 4 and the chambers 8 form an elastic movable structure driving the first mirror 11 or the second mirror 12 to move, thereby changing the distance between the first mirror 11 and the second mirror 12, achieving the filtering effect, and obtaining light with a desired wavelength. In a preferred embodiment, a side of the silicon substrate 10 facing away from the cavity 2 is provided with an insulating layer 9, and the insulating layer 9 is a silica or anti-reflection film. The silica or anti-reflection film on the silicon substrate 10 may increase the light transmittance.

In a preferred embodiment, the silicon film 4 includes a silicon film 4 of a silicon film wafer 6 or a polycrystalline silicon film. The silicon film wafer 6 may be an SOI wafer 6, and at this time, the silicon film 4 on the SOI wafer 6 is monocrystalline silicon. In one case, the silicon film 4 in the SOI wafer 6 may be formed by further machining the SOI wafer 6, and for the specific machining process, reference may be made to the manufacturing process of the silicon film 4 in Embodiment I. In another case, the silicon film 4 may be the polycrystalline silicon film formed by chemical vapor deposition. These two manufacturing processes are both mature and low in cost.

In a preferred embodiment, the surfaces at the position where the first mirror 11 and the second mirror 12 are bonded are provided with a ring electrode 3, respectively. The two ring electrodes 3 form a capacitive driver after the first mirror 11 and the second mirror 12 are bonded. When a voltage is applied to the two ring electrodes 3, the first mirror 11 and the second mirror 12 are displaced relative to each other. The two ring electrodes 3 may each be connected to an extraction electrode for connection with an external circuit. In other optional embodiments, the shape of the electrode 3 is not limited to a ring shape, and may also be an ellipse, a square, etc., which is specifically designed according to the requirements of the device.

In a preferred embodiment, the bonding ways used in the embodiment of the present application includes eutectic bonding, polymer bonding, anodic bonding or direct silicon-silicon bonding, and includes bonding between the silicon film 4 and the silicon film 4/silicon substrate 10 and bonding between the first mirror 11 and the second mirror 12. The eutectic bonding realizes silicon-silicon bonding by using metal as a transition layer, and has the advantages of lower surface requirement, low bonding temperature and high bonding strength. The anodic bonding has the advantages of low bonding temperature, good compatibility with other processes, and high bonding strength and stability, and may be used for bonding between silicon/silicon substrates, between a non-silicon material and a silicon material, and between glass, metals, semiconductors and ceramics. Two silicon wafers (oxidized or non-oxidized) may be directly bonded together by high temperature treatment without any adhesive or external electric field, which is simple in process. This bonding technology is called direct silicon-silicon bonding. A suitable bonding method may be selected to realize the bonding of the mirror chip according to the actual process and material of the surface to be bonded.

The embodiments of the present application disclose a tunable infrared optical filter device, including the first mirror and the second mirror bonded to each other to form the cavity therebetween. The peripheral surface of the position where the first mirror and the second mirror are bonded to each other is provided with the electrode for driving the first mirror or the second mirror to move, and the first mirror and the second mirror respectively are distributed Bragg reflectors formed by bonding the silicon films. The silicon film may be formed by machining the SOI wafer, to form the distributed Bragg reflector composed of the two silicon films and the chambers therebetween. The distributed Bragg reflector may also be formed by bonding the silicon film and the SOI silicon film. Besides, the first mirror and the second mirror may also be bonded at the silicon film that is adjacent to the chambers to form the elastic movable structure, thereby further driving the first mirror or the second mirror to move. The optical filter device is simple in structure and mature in machining techniques, and can realize large-scale production in industry.

The above description is merely specific embodiments of the present application, but the protection scope of the present application is not limited thereto. Any person skilled in the art can easily think of changes or substitutions within the technical scope disclosed in the present application, all of which should be included in the protection scope of the present application. Therefore, the protection scope of the present application shall be subject to the protection scope of the claims.

In the description of the present application, it should be understood that the orientation or positional relationship indicated by the terms "upper", "lower", "inner", "outer", etc. is based on the orientation or positional relationship shown in the accompanying drawings, it is only for the convenience of describing the present application and simplifying the description, rather than indicating or implying that the device or element referred to must have a particular orientation or be constructed and operated in a particular orientation, and therefore, should not be construed as a limitation of the present application. The word 'include' does not exclude the presence of elements or steps not listed in the claims. The word 'a' or 'an' preceding an element does not exclude the presence of a plurality of such elements. The mere fact that certain measures are recited in mutually different dependent claims does not indicate that a combination of these measures cannot be used for improvement. Any reference signs in the claims shall not be construed as limiting the scope.

What is claimed is:

1. A tunable infrared optical filter device, comprising a first mirror and a second mirror bonded to each other forming a cavity therebetween, wherein a surface of a portion of the first mirror and the second mirror which are bonded to each other is provided with an electrode for driving the first mirror or the second mirror to move, the first mirror and the second mirror respectively are distributed Bragg reflectors formed by multipoint bonding silicon films, and the portions of the first mirror and the second mirror bonded to each other corresponds to a position of one of the chambers formed through the multipoint bonding.

2. The tunable infrared optical filter device according to claim 1, wherein the first mirror and the second mirror are respectively formed on a silicon base with an insulating layer, and each of the first mirror and the second mirror comprises a distributed Bragg reflector composed of two silicon films that form chambers therebetween through multipoint bonding.

3. The tunable infrared optical filter device according to claim 2, wherein the silicon film of the first mirror or the second mirror is a silicon film formed by removing a silicon substrate and a corresponding insulating layer on a silicon film wafer.

4. The tunable infrared optical filter device according to claim 3, wherein the silicon base is formed from the silicon substrate of the silicon film wafer.

5. The tunable infrared optical filter device according to claim 3, wherein surfaces of the first mirror and the second mirror facing away from the cavity are provided with a ring weight respectively.

6. The tunable infrared optical filter device according to claim 5, wherein the ring weight is made by remaining part of the silicon substrate on the silicon film wafer.

7. The tunable infrared optical filter device according to claim 2, wherein the insulating layer is a silica or anti-reflection film.

8. The tunable infrared optical filter device according to claim 2, wherein the silicon film comprises monocrystalline silicon film formed on a SOI wafer or polycrystalline silicon film formed by deposition on the silicon substrate with an insulating layer.

9. The tunable infrared optical filter device according to claim 2, wherein the optical thickness of the silicon film and the chamber is ¼ of the center wavelength of the device.

10. The tunable infrared optical filter device according to claim 2, wherein the way of bonding comprises eutectic bonding, polymer bonding, anodic bonding or direct silicon-silicon bonding.

11. The tunable infrared optical filter device according to claim 1, wherein each of the first mirror and the second mirror is a distributed Bragg reflector formed by multipoint bonding the silicon film to a silicon film of a SOI wafer, and the silicon substrate in an area of the SOI wafer corresponding to an active area of the device is partially removed.

12. The tunable infrared optical filter device according to claim 11, wherein the area of the SOI wafer where the silicon substrate is removed has a thickness of 10-200 microns.

13. The tunable infrared optical filter device according to claim 11, wherein the area of the SOI wafer where the silicon substrate is removed comprises an insulating layer and the silicon film of the SOI wafer.

14. The tunable infrared optical filter device according to claim 13, wherein the silicon substrate and the insulating layer on periphery of the SOI wafer form a silicon base for carrying the first mirror or the second mirror.

15. The tunable infrared optical filter device according to claim 1, wherein each of the first mirror and the second mirror is a distributed Bragg reflector formed by multipoint bonding the silicon film to a silicon substrate, and the portions of the first mirror and the second mirror bonded to each other corresponds to a position of one of the chambers formed between the silicon film and the silicon substrate.

16. The tunable infrared optical filter device according to claim 15, wherein a side of the silicon substrate facing away from the cavity is provided with an insulating layer.

17. The tunable infrared optical filter device according to claim 1, wherein the insulating layer is a silica or anti-reflection film.

18. The tunable infrared optical filter device according to claim 1, wherein the silicon film comprises monocrystalline silicon film formed on a SOI wafer or polycrystalline silicon film formed by deposition on the silicon substrate with an insulating layer.

19. The tunable infrared optical filter device according to claim 1, wherein the optical thickness of the silicon film and the chamber is ¼ of the center wavelength of the device.

20. The tunable infrared optical filter device according to claim 1, wherein the way of bonding comprises eutectic bonding, polymer bonding, anodic bonding or direct silicon-silicon bonding.

* * * * *